United States Patent
Yuan et al.

(10) Patent No.: US 11,912,137 B2
(45) Date of Patent: Feb. 27, 2024

(54) METHOD AND DEVICE FOR ASSISTING VEHICLE TO TILT, VEHICLE AND COMPUTER STORAGE MEDIUM

(71) Applicant: NINEBOT (BEIJING) TECH CO., LTD., Beijing (CN)

(72) Inventors: Yubin Yuan, Beijing (CN); Qiang Zhang, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 269 days.

(21) Appl. No.: 17/380,579

(22) Filed: Jul. 20, 2021

(65) Prior Publication Data
US 2022/0032785 A1   Feb. 3, 2022

(30) Foreign Application Priority Data

Jul. 21, 2020   (CN) .......................... 202010714596.7

(51) Int. Cl.
*B60L 15/20*    (2006.01)
*B60L 7/18*     (2006.01)
(Continued)

(52) U.S. Cl.
CPC ............. *B60L 15/2072* (2013.01); *B60L 7/18* (2013.01); *B60L 15/2009* (2013.01);
(Continued)

(58) Field of Classification Search
None
See application file for complete search history.

(56) References Cited

U.S. PATENT DOCUMENTS

| 2016/0144854 A1* | 5/2016 | Watanabe | ............... B60T 8/175 477/185 |
| 2017/0120901 A1 | 5/2017 | Igari | |
| 2018/0370506 A1* | 12/2018 | Igari | ..................... B60W 10/06 |

FOREIGN PATENT DOCUMENTS

| CN | 103339025 | 10/2013 |
| CN | 206745965 U | 12/2017 |

(Continued)

OTHER PUBLICATIONS

The State Intellectual Property Office of People's Republic of China, Office Action for CN application 202010714596.7 with English translation.

(Continued)

*Primary Examiner* — Todd Melton
(74) *Attorney, Agent, or Firm* — Harter Secrest & Emery LLP; Timothy W. Menasco, Esq.

(57) ABSTRACT

A method for assisting a vehicle to tilt includes: receiving a first torque instruction output by a throttle assembly, and generating a second torque instruction, in which the first torque instruction is determined based on a manipulation degree applied to the throttle assembly, and the second torque instruction is determined based on attitude information of the vehicle; performing a weighted summation on the first torque instruction and the second torque instruction based on a first proportional coefficient of the first torque instruction and a second proportional coefficient of the second torque instruction to obtain a third torque instruction; and outputting the third torque instruction to a motor controller, and controlling a tilt angle of the vehicle by the motor controller based on the third torque instruction, in which the tilt angle of the vehicle is less than or equal to a target angle threshold.

17 Claims, 3 Drawing Sheets

(51) Int. Cl.
 *B62K 11/00* (2006.01)
 *B60W 30/04* (2006.01)
(52) U.S. Cl.
 CPC ........... *B62K 11/00* (2013.01); *B60L 2200/12* (2013.01); *B60L 2240/10* (2013.01); *B60L 2240/421* (2013.01); *B60L 2240/423* (2013.01); *B60W 2030/041* (2013.01); *B60W 2520/16* (2013.01); *B60W 2720/16* (2013.01)

(56) References Cited

FOREIGN PATENT DOCUMENTS

| | | |
|---|---|---|
| CN | 110027655 | 7/2019 |
| EP | 2985213 A1 | 2/2016 |
| EP | 3115579 A1 | 1/2017 |
| JP | 2007245993 A | 9/2007 |
| JP | 2009261592 | 11/2009 |

OTHER PUBLICATIONS

European Patent Office, Search Report for EP application 21186726.2.

\* cited by examiner

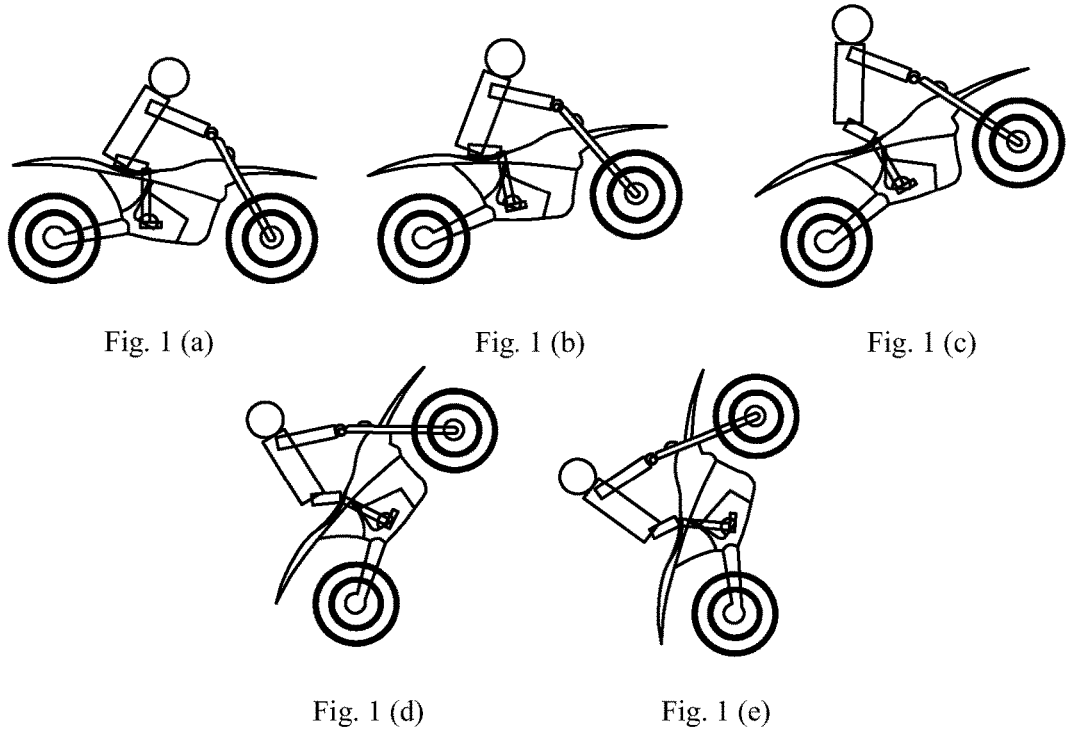
Fig. 1 (a)  Fig. 1 (b)  Fig. 1 (c)
Fig. 1 (d)  Fig. 1 (e)
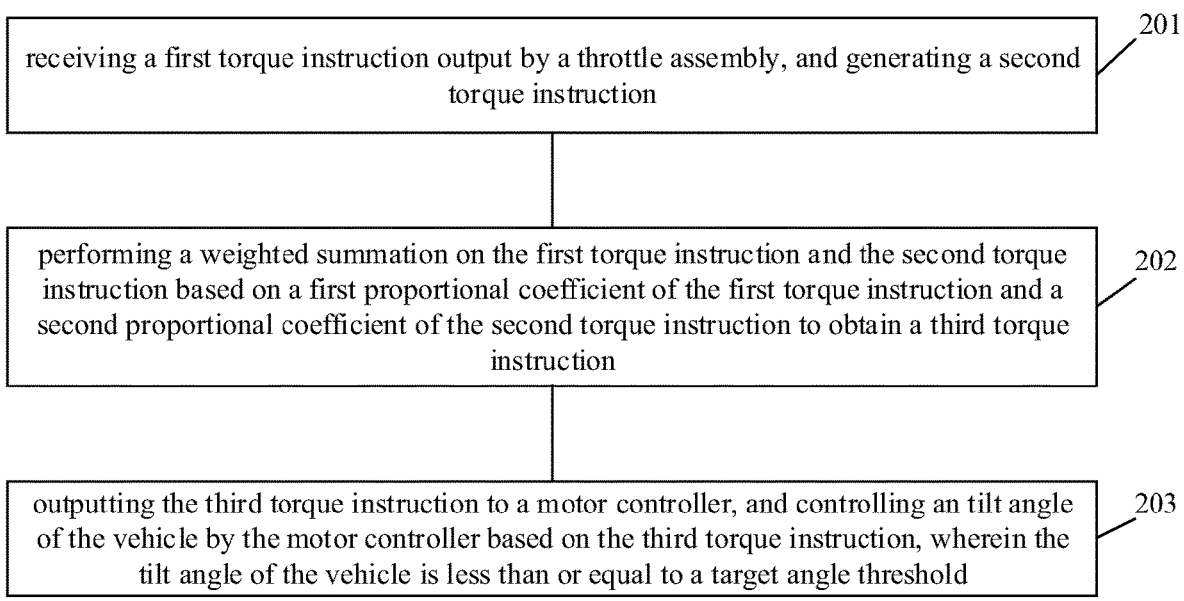
Fig. 2

METHOD AND DEVICE FOR ASSISTING VEHICLE TO TILT, VEHICLE AND COMPUTER STORAGE MEDIUM

CROSS-REFERENCE TO RELATED APPLICATIONS

This application claims a priority to Chinese Patent Application Serial No. 202010714596.7, filed on Jul. 21, 2020, the entire content of which is incorporated herein by reference for all purposes.

FIELD

The present disclosure relates to the vehicle control technology, and more particularly to a method and device for assisting a vehicle to tilt, a vehicle and a computer-readable storage medium.

BACKGROUND

Extreme sportsmen often use a vehicle with multiple wheels in front-rear arrangement to do stunts, such as tilting the vehicle's head up (that is, the rear wheel of the vehicle is on the ground and the front wheel is tilted). For example, for a two-wheel electric motorcycle, traditional operators can only rely on their own experiences to complete the tilting action, which have relatively high requirements on the manipulation and control ability of the operator, and it is difficult for ordinary operators to get the main points when trying the tilting action. If the operator turns the throttle sharply, the tilt angle of the vehicle will exceed a safe angle, resulting in the vehicle overturning. Due to the dangerousness, it is difficult for many beginners to learn such stunt.

SUMMARY

To solve at least one of the above-mentioned technical problems existing in the related art to at least some extent, embodiments of the present disclosure provide a method and device for assisting a vehicle to tilt, a vehicle and a computer-readable storage medium.

In a first aspect of embodiments of the present disclosure, a method for assisting a vehicle to tilt is provided. The method includes:

receiving a first torque instruction output by a throttle assembly, and generating a second torque instruction, in which the first torque instruction is determined based on a manipulation degree applied to the throttle assembly, and the second torque instruction is determined based on attitude information of the vehicle;

performing a weighted summation on the first torque instruction and the second torque instruction based on a first proportional coefficient of the first torque instruction and a second proportional coefficient of the second torque instruction to obtain a third torque instruction; and outputting the third torque instruction to a motor controller, and controlling a tilt angle of the vehicle by the motor controller based on the third torque instruction, in which the tilt angle of the vehicle is less than or equal to a target angle threshold.

In a second aspect of embodiments of the present disclosure, a device for assisting a vehicle to tilt is provided. The device includes:

a receiving unit, configured to receive a first torque instruction output by a throttle assembly and generate a second torque instruction, in which the first torque instruction is determined based on a manipulation degree applied to the throttle assembly, and the second torque instruction is determined based on attitude information of the vehicle;

a weighted summation unit, configured to perform a weighted summation on the first torque instruction and the second torque instruction based on a first proportional coefficient of the first torque instruction and a second proportional coefficient of the second torque instruction to obtain a third torque instruction; and a control unit, configured to output the third torque instruction to a motor controller, and control a tilt angle of the vehicle by the motor controller based on the third torque instruction, in which the tilt angle of the vehicle is less than or equal to a target angle threshold.

In a third aspect of embodiments of the present disclosure, a vehicle is provided. The vehicle includes the device as described in the second aspect of embodiments of the present disclosure.

In a fourth aspect of embodiments of the present disclosure, a computer-readable storage medium is provided. The computer-readable storage medium has stored therein a computer program that, when executed by a processor, causes the processor to perform the method for assisting the vehicle to tilt as described in the first aspect of embodiments of the present disclosure.

BRIEF DESCRIPTION OF THE DRAWINGS

FIG. 1(a) to FIG. 1(e) are schematic diagrams showing a tilting process of a vehicle according to an embodiment of the present disclosure;

FIG. 2 is a flow chart of a method for assisting a vehicle to tilt according to an embodiment of the present disclosure;

DETAILED DESCRIPTION

Figure 3:
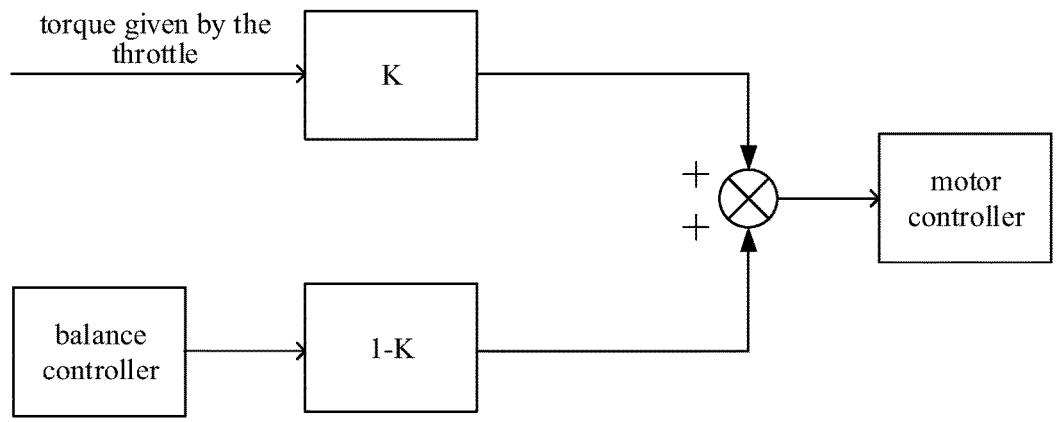
FIG. 3 is a schematic diagram showing a control principle of a method for assisting a vehicle to tilt according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

In a first aspect of embodiments of the present disclosure, a method for assisting a vehicle to tilt is provided. The method includes:

receiving a first torque instruction output by a throttle assembly, and generating a second torque instruction, in which the first torque instruction is determined based on a manipulation degree applied to the throttle assembly, and the second torque instruction is determined based on attitude information of the vehicle;

performing a weighted summation on the first torque instruction and the second torque instruction based on a first proportional coefficient of the first torque instruction and a second proportional coefficient of the second torque instruction to obtain a third torque instruction; and outputting the third torque instruction to a motor controller, and controlling a tilt angle of the vehicle by the motor controller based on the third torque instruction, in which the tilt angle of the vehicle is less than or equal to a target angle threshold.

In an embodiment of the present disclosure, the first proportional coefficient is determined by a user, the first proportional coefficient and the second proportional coefficient are each in a range of 0 to 1, and a sum of the first proportional coefficient and the second proportional coefficient is 1.

In an embodiment of the present disclosure, determining the first proportional coefficient by the user includes:

obtaining a first setting operation on the vehicle, and determining the first proportional coefficient based on the first setting operation; or receiving a setting instruction sent by a client, and determining the first proportional coefficient based on the setting instruction, in which the setting instruction is generated by the client based on a second setting operation.

In an embodiment of the present disclosure, the method further includes:

determining a proportional coefficient smaller than a target coefficient threshold as the first proportional coefficient when the tilt angle of the vehicle is greater than or equal to the target angle threshold;

determining a proportional coefficient greater than the target coefficient threshold as the first proportional coefficient when the tilt angle of the vehicle is less than the target angle threshold.

In an embodiment of the present disclosure, outputting the third torque instruction to the motor controller includes:

outputting the third torque instruction to the motor controller in a form of a throttle signal when the third torque instruction is a positive torque instruction; or outputting the third torque instruction to the motor controller in a form of a brake signal when the third torque instruction is a negative torque instruction.

In an embodiment of the present disclosure, outputting the third torque instruction to the motor controller in the form of the brake signal includes:

outputting the third torque instruction to the motor controller in the form of the brake signal at a set frequency.

In a second aspect of embodiments of the present disclosure, a device for assisting a vehicle to tilt is provided. The device includes:

a receiving unit, configured to receive a first torque instruction output by a throttle assembly and generate a second torque instruction, in which the first torque instruction is determined based on a manipulation degree applied to the throttle assembly, and the second torque instruction is determined based on attitude information of the vehicle;

a weighted summation unit, configured to perform a weighted summation on the first torque instruction and the second torque instruction based on a first proportional coefficient of the first torque instruction and a second proportional coefficient of the second torque instruction to obtain a third torque instruction; and a control unit, configured to output the third torque instruction to a motor controller, and control a tilt angle of the vehicle by the motor controller based on the third torque instruction, in which the tilt angle of the vehicle is less than or equal to a target angle threshold.

In an embodiment of the present disclosure, the first proportional coefficient is determined by a user, the first proportional coefficient and the second proportional coefficient are each in a range of 0 to 1, and a sum of the first proportional coefficient and the second proportional coefficient is 1.

In an embodiment of the present disclosure, the device further includes: a first determining unit, configured to obtain a first setting operation on the vehicle, and determine the first proportional coefficient based on the first setting operation; or configured to receive a setting instruction sent by a client, and determine the first proportional coefficient based on the setting instruction, in which the setting instruction is generated by the client based on a second setting operation.

In an embodiment of the present disclosure, the device further includes: a second determining unit, configured to determine a proportional coefficient smaller than a target coefficient threshold as the first proportional coefficient when the tilt angle of the vehicle is greater than or equal to the target angle threshold, and determine a proportional coefficient greater than the target coefficient threshold as the first proportional coefficient when the tilt angle of the vehicle is less than the target angle threshold.

In an embodiment of the present disclosure, the control unit is further configured to output the third torque instruction to the motor controller in a form of a throttle signal when the third torque instruction is a positive torque instruction; or configured to output the third torque instruction to the motor controller in a form of a brake signal when the third torque instruction is a negative torque instruction.

In an embodiment of the present disclosure, the control unit is further configured to output the third torque instruction to the motor controller in the form of the brake signal at a set frequency.

In a third aspect of embodiments of the present disclosure, a vehicle is provided. The vehicle includes the device as described in the second aspect of embodiments of the present disclosure.

In a fourth aspect of embodiments of the present disclosure, a computer-readable storage medium is provided. The computer-readable storage medium has stored therein a computer program that, when executed by a processor, causes the processor to perform the method for assisting the vehicle to tilt as described in the first aspect of embodiments of the present disclosure.

According to embodiments of the present disclosure, the first torque instruction output by the throttle assembly is received, and the second torque instruction is generated, in which the first torque instruction is determined based on the manipulation degree applied to the throttle assembly, and the second torque instruction is determined based on the attitude information of the vehicle; the weighted summation is performed on the first torque instruction and the second torque instruction based on the first proportional coefficient of the first torque instruction and the second proportional coefficient of the second torque instruction to obtain the third torque instruction; and the third torque instruction is output to the motor controller, and the motor controller controls the tilt angle of the vehicle based on the third torque instruction, in which the tilt angle of the vehicle is less than or equal to the target angle threshold. In this way, the tilting action of the vehicle may be completed on the basis of the user's manipulation skills in combination with the assistance of a balance controller. By combining the first torque instruction generated when the user operates the throttle and the second torque instruction generated by the balance controller based on the attitude information of the vehicle, and taking into account the respective proportional coefficients of the two torque instructions, a total torque instruction is generated to control the motor of the vehicle. By controlling the motor torque of the vehicle with the total torque instruction, the tilt angle of the vehicle may be controlled within a safe angle range when the user uses the vehicle to complete the tilting action, thereby preventing the vehicle from overturning.

The technical solutions according to embodiments of the present disclosure are applicable to tilt assisting control of a vehicle with multiple wheels in front-rear arrangement. For ease of understanding, embodiments of the present disclosure will be illustrated by taking the tilt assisting control of an electric motorcycle as an example. FIG. 1(a) to FIG. 1(e) are schematic diagrams showing a tilting process of a vehicle according to an embodiment of the present disclosure. Among them, FIG. 1(a) is a schematic diagram showing a normal riding state of the vehicle; FIG. 1(b), FIG. 1(c) and FIG. 1(d) are schematic diagrams showing states of the vehicle in which tilt angles of the head of the vehicle are within a safe angle range; and FIG. 1(e) is a schematic diagram showing a state of the vehicle in which the tilt angle of the head of the vehicle exceeds the safe angle range. Embodiments of the present disclosure mainly aim at controlling the tilt angle of the head of the vehicle within the safe angle range. It is to be understood that embodiments of the present disclosure are not only applicable to the tilt assisting control of the electric motorcycle, but also to all vehicles with multiple wheels in the front-rear arrangement.

FIG. 2 is a flow chart showing a method for assisting a vehicle to tilt according to an embodiment of the present disclosure. As shown in FIG. 2, the method includes the following operations as illustrated in blocks of FIG. 2.

At block 201, a first torque instruction output by a throttle assembly is received, and a second torque instruction is generated.

In embodiments of the present disclosure, the first torque instruction is determined based on a manipulation degree applied to the throttle assembly, and the second torque instruction is determined based on attitude information of the vehicle.

When the vehicle is used, the user manipulates the throttle assembly of the vehicle to make the throttle assembly output the first torque instruction, which enables the head of the vehicle to raise to a certain angle (a specific value of the angle is determined based on a magnitude of the first torque instruction). Here, the first torque instruction is usually a positive torque instruction.

The vehicle is provided with an attitude detection assembly, which is able to detect the attitude information of the vehicle, and the attitude information includes the tilt angle of the head of the vehicle. When the user turns the throttle sharply during use, the head of the vehicle may raise to a certain angle, and the attitude detection assembly of the vehicle can detect the tilt angle of the vehicle.

In embodiments of the present disclosure, the vehicle is provided with a tilt assisting module, which is a functional unit configured to assist the vehicle to tilt. The tilt assisting module may be a module separately installed on the vehicle, or may be integrated in a main controller or a motor controller of the vehicle. The function of the tilt assisting module may be realized by a circuit module of hardware, or by a software program. The tilt assisting module has a balance controller, which may be a balance control algorithm. After obtaining the tilt angle of the head of the vehicle, the balance controller may, based on this tilt angle, generate the second torque instruction, which enables the vehicle to keep balance at this tilt angle. Here, the second torque instruction may be a positive torque instruction or a negative torque instruction. When the user executes the tilting action of the vehicle, the tilt assisting module is configured to receive the first torque instruction output by the throttle assembly and generate the second torque instruction based on the balance controller.

At block 202, a weighted summation is performed on the first torque instruction and the second torque instruction based on a first proportional coefficient of the first torque instruction and a second proportional coefficient of the second torque instruction to obtain a third torque instruction.

In some embodiments, the first proportional coefficient is determined by a user, the first proportional coefficient and the second proportional coefficient are each in a range of 0 to 1, and a sum of the first proportional coefficient and the second proportional coefficient is 1.

Here, the first proportional coefficient and the second proportional coefficient refer to weights of the first torque instruction and the second torque instruction, respectively. When the first proportional coefficient is larger, the tilting action of the vehicle is more dependent on the user's manipulation skills than the assisting function of the balance controller during the tilting process of the vehicle. When the first proportional coefficient is smaller, that is, the second proportional coefficient is larger; the tilting action of the vehicle is more dependent on the assisting function of the balance controller than the user's manipulation skills during the tilting process of the vehicle.

Specifically, FIG. 3 is a schematic diagram showing a control principle of a method for assisting a vehicle to tilt according to some embodiments of the present disclosure. As shown in FIG. 3, in embodiments of the present disclosure, the balance controller (i.e., the balance control algorithm) for controlling the tilt angle of the electric motor is provided to assist the tilting action of the electric motor on the basis of the user's manipulation skills. The balance control algorithm runs in the tilt assisting module, and generates the corresponding torque instruction based on the attitude information of the vehicle. When the user controls the vehicle to complete the tilting action, the motor controller will output a total torque instruction in response to the tilt assisting module. The total torque instruction is generated based on a combined action of a torque instruction given by the user (i.e., the first torque instruction output by the throttle assembly) and a torque instruction generated by the balance controller (i.e., the second torque instruction). Specific weights of the torque instruction given by the user and the torque instruction generated by the balance controller may be adjusted by the first proportional coefficient K, where K is between 0 and 1. When the user adjusts the K to be 1, the vehicle responds 100% to the user's throttle torque information, and the torque instruction generated by the balance controller does not act on the motor controller, such that the user completely relies on his own manipulation skills to complete the tilting action of the vehicle. When the user adjusts the K to be 0, the vehicle responds 100% to the torque instruction generated by the balance controller, and the tilting action of the vehicle entirely relies on the balance controller, such that the user may safely and stably complete the tilting action of the vehicle. Given the control function of the balance controller, when the user is not proficient in controlling the tilting action, the function of the balance controller may be adjusted to be larger (that is, lowering the value of K to make the value of 1-K increase), which may prevent the tilt angle of the vehicle from exceeding the safe angle range, and prevent the vehicle from overturning to a certain extent if the user turns the throttle sharply.

In some embodiments, determining the first proportional coefficient by the user includes:

obtaining a first setting operation on the vehicle, and determining the first proportional coefficient based on the first setting operation; or receiving a setting instruction sent by a client, and determining the first proportional coefficient based on the setting instruction, in which the setting instruction is generated by the client based on a second setting operation received.

Specially, physically adjustable buttons, knobs, and keys may be provided on the electric motorcycle to facilitate the user to set the K value of the vehicle, or the K value of the vehicle may be set through an application in a mobile phone. After K value is set by the user, the tilt assisting module of the vehicle may obtain the K value set by the user.

In some embodiments, the first proportional coefficient may be dynamically adjusted based on the first proportional coefficient set by the user in the following manners.

When the tilt angle of the vehicle is greater than or equal to a target angle threshold, a proportional coefficient smaller than a target coefficient threshold is determined as the first proportional coefficient.

When the tilt angle of the vehicle is less than the target angle threshold, a proportional coefficient greater than the target coefficient threshold is determined as the first proportional coefficient.

Here, the target angle threshold is a maximum tilt angle that the vehicle can reach under the condition that the vehicle does not turnover. The K value may be adjusted by the vehicle based on the tilt angle of the head of the vehicle. When the vehicle is operated by a user, if the tilt angle of the head of the vehicle is detected to exceed a safe angle threshold, the user is judged as a beginner, then the K value is directly adjusted to a smaller value to increase the weight of the torque instruction generated by the balance controller based on the attitude information of the vehicle. If the tilting angle of the head of the vehicle is detected always within the safe angle range, the user is judged as a skilled person, then the K value is correspondingly adjusted to a relatively large value to increase the weight of the torque instruction given by a throttle signal.

At block 203, the third torque instruction is output to the motor controller to control the tilt angle of the vehicle by the motor controller based on the third torque instruction. The tilt angle of the vehicle is less than or equal to the target angle threshold.

Specially, by combining the manipulation of the user to the throttle assembly with the action of the balance controller, the tilt assisting module generates the third torque instruction and outputs the third torque instruction to the motor controller of the vehicle, so that the motor controller generates a torque control signal for the motor based on the third torque instruction to control an output torque of the motor. The change of the output torque of the motor may be used to adjust the attitude of the vehicle. Under the action of the third torque instruction, when the vehicle performs the tilting action, the tilt angle will not exceed the target angle threshold. The target angle threshold is the maximum tilt angle that the vehicle can reach under the condition that the vehicle does not turnover.

In some embodiments, the tilt assisting module of the vehicle is directly embedded in the motor controller. When the tilt assisting module is directly embedded in the motor controller, the first torque instruction output by the throttle assembly and the second torque instruction generated by the balance controller are received by the tilt assisting module in the motor controller. After the tilt assisting module performs the weighted summation on the first torque instruction and the second torque instruction based on the first proportional coefficient and the second proportional coefficient to obtain the third torque instruction, the motor controller outputs a torque control signal to the motor based on the third torque instruction to control the output torque of the motor, thereby controlling the tilt angle of the vehicle within the safe angle range.

In some embodiments, the assisting tilt module of the vehicle is directly embedded in the main controller of the vehicle. When the assisting tilt module is directly embedded in the main controller of the vehicle, the first torque instruction output by the throttle assembly and the second torque instruction generated by the balance controller are received by the tilt assisting module in the main controller. After the tilt assisting module performs the weighted summation on the first torque instruction and the second torque instruction based on the first proportional coefficient and the second proportional coefficient to obtain the third torque instruction, the main controller outputs the third torque instruction to the motor controller, and the motor controller outputs a torque control signal to the motor based on the third torque instruction to control the output torque of the motor, thereby controlling the tilt angle of the vehicle within the safe angle range.

In some embodiments, the tilt assisting module of the vehicle may also be a separate external accessory module. By connecting the vehicle to the tilt assisting module, the first torque instruction output by the throttle assembly and the second torque instruction generated by the balance controller are received by the separate tilt assisting module. After obtaining the third torque instruction by performing the weighted summation on the first torque instruction and the second torque instruction based on the first proportional coefficient and the second proportional coefficient, the tilt assisting module outputs the third torque instruction to the motor controller, and then the motor controller outputs a torque control signal to the motor based on the third torque instruction to control the output torque of the motor, thereby controlling the tilt angle of the vehicle within the safe angle range.

Figure 4:
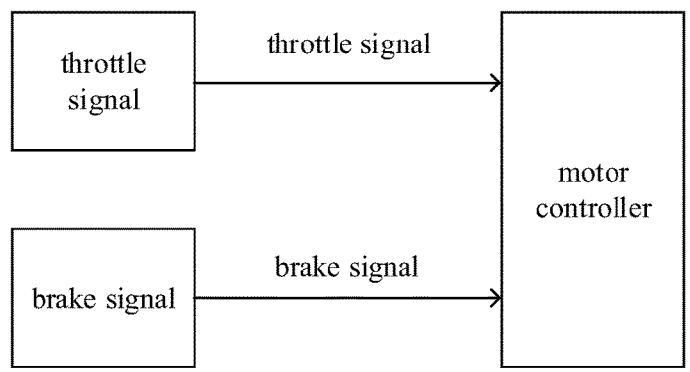
FIG. 4 is a schematic diagram showing a link of control signals received by a motor controller of a typical vehicle provided in the present disclosure for ease of understanding.

FIG. 4 is a schematic diagram showing a link of control signals received by a motor controller of a typical vehicle. As shown in FIG. 4, a throttle signal and a brake signal of the vehicle are generally directly input to the motor controller, so that the motor controller realizes the acceleration or deceleration control of the vehicle based on the received throttle signal or brake signal.

In some embodiments, for an ordinary vehicle, a tilt assisting function may be extended thereto by providing an external accessory module thereon. When the external accessory with the tilt assisting function is connected to the ordinary vehicle, the tilt assisting function of the vehicle may be realized by changing an electrical architecture of the vehicle.

Figure 5:
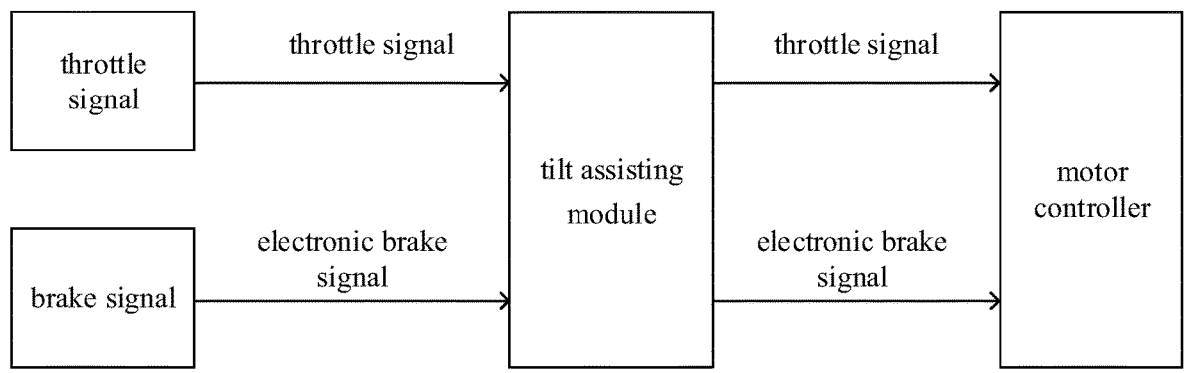
FIG. 5 is a schematic diagram showing a link of control signals received by a motor controller of a vehicle embedded with a tilt assisting module according to an embodiment of the present disclosure.

FIG. 5 is a schematic diagram showing a link of control signals received by a motor controller of a vehicle embedded with a tilt assisting module according to an embodiment of the present disclosure.

Specially, by providing the tilt assisting module on the vehicle, the tilt assisting module is added to the link of the control signals (including the throttle signal and the brake signal) received by the motor controller. The tilt assisting module is configured to intercept the original throttle signal and brake signal of the vehicle. When the vehicle is not working in a tilting mode, the tilt assisting module transfers the throttle signal and brake signal to the motor controller as they are. When the vehicle is working in the tilting mode, the tilt assisting module embeds the signal output by the balance controller on the basis of the original throttle signal and brake signal and then transfer them to the motor controller. The tilt assisting module of the vehicle is capable of generating a final torque instruction to be output to the motor controller according to the torque instruction given by the throttle assembly of the vehicle and the torque instruction generated by the balance controller in combination with the first proportional coefficient of the torque instruction given by the throttle assembly and the second proportional coefficient of the torque instruction generated by the balance controller, so as to allow the motor controller to control the output torque of the motor based on the final torque instruction, thereby guaranteeing the tilt angle of the vehicle within the safe angle range.

In some embodiments, outputting the third torque instruction to the motor controller includes:

outputting the third torque instruction to the motor controller in a form of a throttle signal when the third torque instruction is a positive torque instruction; or outputting the third torque instruction to the motor controller in a form of a brake signal when the third torque instruction is a negative torque instruction.

Here, as the throttle signal generally only provides the positive torque instruction, so when the tilt assisting module intends to output the negative torque instruction, the tilt assisting module may output a brake signal to the motor controller, so as to realize the output of the negative torque instruction in the form of the brake signal.

In some embodiments, outputting the third torque instruction to the motor controller in the form of the brake signal includes: outputting the third torque instruction to the motor controller in the form of the brake signal at a set frequency.

Specially, since the brake signal of the vehicle usually only enables the motor controller to output a constant negative torque, in order to make the motor controller output continuous negative torques, the third torque instruction may be continuously output at a higher frequency, such that the motor controller outputs continuous negative torque signals. Here, due to the gravity of the vehicle, the tilt assisting module is less dependent on the negative torque when the head of the vehicle is raised at a small angle.

According to embodiments of the present disclosure, the tilting action of the vehicle can be completed on the basis of the user's manipulation skills in combination with the assistance of the balance controller. By combining the first torque instruction generated when the user operates the throttle and the second torque instruction generated by the balance controller based on the attitude information of the vehicle, a total torque instruction is generated to control the motor of the vehicle. By controlling the motor torque of the vehicle with the total torque instruction, the tilt angle of the vehicle may be controlled within the safe angle range when the user uses the vehicle to complete the tilting action, thereby preventing the vehicle from overturning. In addition, when the user performs the tilting action on the vehicle, by adjusting the strength of the tilt assisting function of the balance controller, the tilt assisting function of the balance controller may be enhanced when the user is not proficient in the tilting action, so as to provide a safe and reliable tilting protection solution for the user to prevent the tilt angle of the vehicle from exceeding the safe angle range; and when the user is proficient in the tilting action, the tilt assisting function of the balance controller may be lowered, so that the user may experience the complete and excite tilting action.

Figure 6:
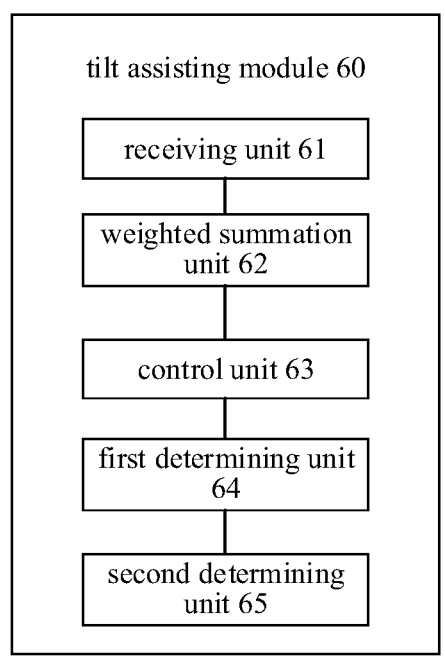
FIG. 6 is a schematic block diagram of a device for assisting a vehicle to tilt according to an embodiment of the present disclosure.

The present disclosure also provides in some embodiments a device for assisting a vehicle to tilt. FIG. 6 is a schematic block diagram of a device 60 for assisting a vehicle to tilt according to some embodiments of the present disclosure. As shown in FIG. 6, the device includes: a receiving unit 61, a weighted summation unit 62 and a control unit 63.

The receiving unit 61 is configured to receive a first torque instruction output by a throttle assembly and generate a second torque instruction. The first torque instruction is determined based on a manipulation degree applied to the throttle assembly, and the second torque instruction is determined based on attitude information of the vehicle.

The weighted summation unit 62 is configured to perform a weighted summation on the first torque instruction and the second torque instruction based on a first proportional coefficient of the first torque instruction and a second proportional coefficient of the second torque instruction to obtain a third torque instruction.

The control unit 63 is configured to output the third torque instruction to a motor controller, and control a tilt angle of the vehicle by the motor controller based on the third torque instruction. The tilt angle of the vehicle is less than or equal to a target angle threshold.

In some embodiments, the first proportional coefficient is determined by a user, the first proportional coefficient and the second proportional coefficient are each in a range of 0 to 1, and a sum of the first proportional coefficient and the second proportional coefficient is 1.

In some embodiments, the device further includes a first determining unit 64. The first determining unit 64 is configured to obtain a first setting operation on the vehicle, and determine the first proportional coefficient based on the first setting operation; or configured to receive a setting instruction sent by a client, and determine the first proportional coefficient based on the setting instruction. The setting instruction is generated by the client based on a second setting operation.

In some embodiments, the device further includes a second determining unit 65. The second determining unit 65 is configured to determine a proportional coefficient smaller than a target coefficient threshold as the first proportional coefficient when the tilt angle of the vehicle is greater than or equal to the target angle threshold, and determine a proportional coefficient greater than the target coefficient threshold as the first proportional coefficient when the tilt angle of the vehicle is less than the target angle threshold.

In some embodiments, the control unit 63 is further configured to output the third torque instruction to the motor controller in a form of a throttle signal when the third torque instruction is a positive torque instruction; or configured to output the third torque instruction to the motor controller in a form of a brake signal when the third torque instruction is a negative torque instruction.

In some embodiments, the control unit 63 is further configured to output the third torque instruction to the motor controller in the form of the brake signal at a set frequency.

It should be understand that the functions of various units in the device for assisting the vehicle to tilt as shown in FIG. 6 may be understood with reference to the related descriptions of the above-mentioned method for assisting the vehicle to tilt. The functions of various units in the device for assisting the vehicle to tilt as shown in FIG. 6 may be realized by a program running on a processor, or by a specific logic circuit.

Embodiments of the present disclosure also provide a vehicle. The vehicle includes the device for assisting the vehicle to tilt as described in any embodiment hereinbefore, a throttle assembly, a motor controller and a motor. The device for assisting the vehicle may be provided separately, or be disposed in a motor controller or a main controller of the vehicle to complete the tilt assisting function.

Embodiments of the present disclosure also provide a computer-readable storage medium. The computer-readable storage medium has stored therein a computer program that, when executed by a processor, causes the processor to perform the method for assisting the vehicle to tilt as described in any embodiments hereinbefore.

It should be noted that, the embodiments of the present disclosure and the characteristics of the embodiments can be mutually combined under the condition of no conflict.

It should be understood that, the method and intelligent device as described in the above embodiments of the present disclosure may be implemented by other manners. The device embodiments described above are merely illustrative. For example, the division of the units is only a logical function division, and there may be other divisions in actual implementation, such as, multiple units or components may be combined or integrated into another system, or some features may be ignored or not implemented. In addition, coupling or direct coupling, or communication connection between the components shown or discussed may be indirect coupling or communication connection through some interfaces, apparatuses, or units, and may be electrical connection, mechanical connection, or connections in other forms.

The units described above as separate components may be physically separated or not, and the components displayed as units may be physical units or not, that is, they may be located in one place or distributed on multiple network units. Part or all of the units may be selected according to a practical need to achieve the objectives of embodiments of the present disclosure.

In addition, the functional units as described in various embodiments of the present disclosure may be integrated into a second processing unit, or each unit may be used separately, or two or more units may be integrated into one unit. The integrated unit may be implemented through hardware, or may also be implemented in a form of hardware plus a software functional module.

The above-described embodiments are only some specific implementation modes of the present disclosure and cannot be construed to limit the protection scope of the present disclosure. Any variations, modifications, changes, alternatives, or replacements can be made in the embodiments by those skilled in the art without departing from spirit and principles of the present disclosure shall fall within the protection scope of the present disclosure.

What is claimed is:

1. A method for assisting a vehicle to tilt, comprising:
receiving a first torque instruction output by a throttle assembly, and generating a second torque instruction, wherein the first torque instruction is determined based on a manipulation degree applied to the throttle assembly, and the second torque instruction is determined based on attitude information of the vehicle;
performing a weighted summation on the first torque instruction and the second torque instruction based on a first proportional coefficient of the first torque instruction and a second proportional coefficient of the second torque instruction to obtain a third torque instruction;
outputting the third torque instruction to a motor controller, and controlling a tilt angle of the vehicle by the motor controller based on the third torque instruction, wherein the tilt angle of the vehicle is less than or equal to a target angle threshold;
determining a proportional coefficient smaller than a target coefficient threshold as the first proportional coefficient when the tilt angle of the vehicle is greater than or equal to the target angle threshold;
determining a proportional coefficient greater than the target coefficient threshold as the first proportional coefficient when the tilt angle of the vehicle is less than the target angle threshold.

2. The method according to claim 1, wherein the first proportional coefficient is determined by a user, the first proportional coefficient and the second proportional coefficient are each in a range of 0 to 1, and a sum of the first proportional coefficient and the second proportional coefficient is 1.

3. The method according to claim 2, wherein determining the first proportional coefficient by the user comprises:
obtaining a first setting operation on the vehicle, and determining the first proportional coefficient based on the first setting operation; or
receiving a setting instruction sent by a client, and determining the first proportional coefficient based on the setting instruction, wherein the setting instruction is generated by the client based on a second setting operation.

4. The method according to claim 1, wherein outputting the third torque instruction to the motor controller comprises:
outputting the third torque instruction to the motor controller in a form of a throttle signal when the third torque instruction is a positive torque instruction; or
outputting the third torque instruction to the motor controller in a form of a brake signal when the third torque instruction is a negative torque instruction.

5. The method according to claim 4, wherein outputting the third torque instruction to the motor controller in the form of the brake signal comprises:
outputting the third torque instruction to the motor controller in the form of the brake signal at a set frequency.

6. The method according to claim 1, wherein outputting the third torque instruction to a motor controller comprises:
outputting the third torque instruction to a main controller of the vehicle, and transferring, via the main controller of the vehicle, the third torque instruction to the motor controller.

7. A vehicle, comprising a throttle assembly, a motor controller, and a device for assisting the vehicle to tilt, wherein the device comprises:
a receiving unit, configured to receive a first torque instruction output by the throttle assembly and generate a second torque instruction, wherein the first torque instruction is determined based on a manipulation degree applied to the throttle assembly, and the second torque instruction is determined based on attitude information of the vehicle;
a weighted summation unit, configured to perform a weighted summation on the first torque instruction and the second torque instruction based on a first proportional coefficient of the first torque instruction and a second proportional coefficient of the second torque instruction to obtain a third torque instruction;
a control unit, configured to output the third torque instruction to the motor controller, and control a tilt angle of the vehicle by the motor controller based on the third torque instruction, wherein the tilt angle of the vehicle is less than or equal to a target angle threshold;
a second determining unit, configured to determine a proportional coefficient smaller than a target coefficient threshold as the first proportional coefficient when the tilt angle of the vehicle is greater than or equal to the target angle threshold, and determine a proportional coefficient greater than the target coefficient threshold as the first proportional coefficient when the tilt angle of the vehicle is less than the target angle threshold.

8. The vehicle according to claim 7, wherein the first proportional coefficient is determined by a user, the first proportional coefficient and the second proportional coefficient are each in a range of 0 to 1, and a sum of the first proportional coefficient and the second proportional coefficient is 1.

9. The vehicle according to claim 8, further comprising:
a first determining unit, configured to obtain a first setting operation on the vehicle, and determine the first proportional coefficient based on the first setting operation; or configured to receive a setting instruction sent by a client, and determine the first proportional coefficient based on the setting instruction;
wherein the setting instruction is generated by the client based on a second setting operation.

10. The vehicle according to claim 7, wherein
the control unit is further configured to output the third torque instruction to the motor controller in a form of a throttle signal when the third torque instruction is a positive torque instruction; or configured to output the third torque instruction to the motor controller in a form of a brake signal when the third torque instruction is a negative torque instruction.

11. The vehicle according to claim 10, wherein
the control unit is further configured to output the third torque instruction to the motor controller in the form of the brake signal at a set frequency.

12. A non-transitory computer-readable storage medium having stored therein a computer program that, when executed by a processor, causes the processor to perform the method for assisting a vehicle to tilt, comprising:
receiving a first torque instruction output by a throttle assembly, and generating a second torque instruction, wherein the first torque instruction is determined based on a manipulation degree applied to the throttle assembly, and the second torque instruction is determined based on attitude information of the vehicle;
performing a weighted summation on the first torque instruction and the second torque instruction based on a first proportional coefficient of the first torque instruction and a second proportional coefficient of the second torque instruction to obtain a third torque instruction;
outputting the third torque instruction to a motor controller, and controlling a tilt angle of the vehicle by the motor controller based on the third torque instruction, wherein the tilt angle of the vehicle is less than or equal to a target angle threshold;
determining a proportional coefficient smaller than a target coefficient threshold as the first proportional coefficient when the tilt angle of the vehicle is greater than or equal to the target angle threshold;
determining a proportional coefficient greater than the target coefficient threshold as the first proportional coefficient when the tilt angle of the vehicle is less than the target angle threshold.

13. The non-transitory computer-readable storage medium according to claim 12, wherein the first proportional coefficient is determined by a user, the first proportional coefficient and the second proportional coefficient are each in a range of 0 to 1, and a sum of the first proportional coefficient and the second proportional coefficient is 1.

14. The non-transitory computer-readable storage medium according to claim 13, wherein determining the first proportional coefficient by the user comprises:
obtaining a first setting operation on the vehicle, and determining the first proportional coefficient based on the first setting operation; or
receiving a setting instruction sent by a client, and determining the first proportional coefficient based on the setting instruction, wherein the setting instruction is generated by the client based on a second setting operation.

15. The non-transitory computer-readable storage medium according to claim 12, wherein outputting the third torque instruction to the motor controller comprises:
outputting the third torque instruction to the motor controller in a form of a throttle signal when the third torque instruction is a positive torque instruction; or
outputting the third torque instruction to the motor controller in a form of a brake signal when the third torque instruction is a negative torque instruction.

16. The non-transitory computer-readable storage medium according to claim 15, wherein outputting the third torque instruction to the motor controller in the form of the brake signal comprises:
outputting the third torque instruction to the motor controller in the form of the brake signal at a set frequency.

17. The non-transitory computer-readable storage medium according to claim 12, wherein outputting the third torque instruction to a motor controller comprises:
outputting the third torque instruction to a main controller of the vehicle, and transferring, via the main controller of the vehicle, the third torque instruction to the motor controller.

* * * * *